United States Patent
Truskovsky et al.

(10) Patent No.: US 9,088,556 B2
(45) Date of Patent: *Jul. 21, 2015

(54) METHODS AND DEVICES FOR DETECTING UNAUTHORIZED ACCESS TO CREDENTIALS OF A CREDENTIAL STORE

(71) Applicant: BLACKBERRY LIMITED, Waterloo (CA)

(72) Inventors: Alexander Truskovsky, Waterloo (CA); Christopher Lyle Bender, Kitchener (CA); Daryl Joseph Martin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 88 days.

This patent is subject to a terminal disclaimer.

(21) Appl. No.: 13/891,258

(22) Filed: May 10, 2013

(65) Prior Publication Data
US 2014/0337937 A1    Nov. 13, 2014

(51) Int. Cl.
*H04L 29/06*    (2006.01)

(52) U.S. Cl.
CPC ...................................... *H04L 63/08* (2013.01)

(58) Field of Classification Search
USPC .................................................. 726/4, 5, 22
See application file for complete search history.

(56) References Cited

U.S. PATENT DOCUMENTS

| | | | |
|---|---|---|---|
| 6,208,339 B1 | 3/2001 | Atlas et al. | |
| 7,136,490 B2 | 11/2006 | Martinez et al. | |
| 7,490,242 B2 | 2/2009 | Torres et al. | |
| 7,552,467 B2 | 6/2009 | Lindsay | |
| 7,818,809 B1 | 10/2010 | Sobel et al. | |
| 8,065,724 B2 | 11/2011 | Waltenberg et al. | |
| 8,108,685 B2 | 1/2012 | Hurley | |
| 8,156,342 B2 | 4/2012 | Roth et al. | |
| 8,200,582 B1 | 6/2012 | Zhu | |
| 8,230,231 B2 | 7/2012 | Freeman et al. | |
| 8,281,372 B1 * | 10/2012 | Vidal | 726/5 |
| 8,286,000 B2 | 10/2012 | Vedula et al. | |

(Continued)

FOREIGN PATENT DOCUMENTS

| | | |
|---|---|---|
| EP | 1315065 | 5/2003 |
| EP | 1918844 | 5/2008 |
| EP | 2801925 | 11/2014 |

OTHER PUBLICATIONS

"A survey on security issues in service delivery models of cloud computing"; S. Subashini et al; Journal of Network and Computer Applications (2011) 11 pages.*

(Continued)

*Primary Examiner* — Jason Lee
(74) *Attorney, Agent, or Firm* — Integral Intellectual Property Inc.; Miriam Paton; Amy Scouten

(57) ABSTRACT

Methods and devices for detecting unauthorized access to credentials of a credential store on a computing device are disclosed herein. In one broad aspect, the method comprises monitoring a plurality of credentials of the credential store accessed within a period associated with a first setting, and responsive to determining that a number of credentials accessed within the period exceeds a threshold associated with a second setting, outputting, in a user interface, an indication of potential unauthorized access to the credential store. In at least one embodiment, each of the credentials accessed within the period is associated with a different user account.

27 Claims, 6 Drawing Sheets

(56) References Cited

U.S. PATENT DOCUMENTS

| | | | |
|---|---|---|---|
| 8,291,470 | B2 | 10/2012 | Delia et al. |
| 8,321,437 | B2 | 11/2012 | Lim |
| 2003/0135382 | A1* | 7/2003 | Marejka et al. ............ 705/1 |
| 2005/0203881 | A1 | 9/2005 | Sakamoto et al. |
| 2006/0242109 | A1 | 10/2006 | Pereira et al. |
| 2007/0005975 | A1 | 1/2007 | Bauchot et al. |
| 2007/0039042 | A1 | 2/2007 | Apelbaum |
| 2008/0320588 | A1 | 12/2008 | Lipetz |
| 2009/0150677 | A1 | 6/2009 | Vedula et al. |
| 2009/0165102 | A1 | 6/2009 | Zagni |
| 2009/0216795 | A1 | 8/2009 | Cohen et al. |
| 2010/0132043 | A1 | 5/2010 | Bjorn et al. |
| 2010/0250497 | A1* | 9/2010 | Redlich et al. ............ 707/661 |
| 2010/0293605 | A1 | 11/2010 | Longobardi |
| 2012/0110668 | A1 | 5/2012 | Schechter et al. |
| 2012/0324547 | A1* | 12/2012 | Vidal ............ 726/4 |
| 2013/0014236 | A1 | 1/2013 | Bingell et al. |
| 2014/0337941 | A1 | 11/2014 | Kominar et al. |

OTHER PUBLICATIONS

Anonymous, "LastPass Now Warns You When You're Using a Weak or Duplicate Password", LastPass, Mar. 25, 2013, XP002713289. Retrieved from the Internet: URL:http://blog.lastpass.com/2013/03/lastpass-now-warns-you-when-youre-using.html [retrieved on Sep. 11, 2013].

Anonymous, "New Year's Resolutions with LastPass: #3 Replace Weak and Duplicate Passwords", LastPass, Jan. 9, 2012, XP002713290. Retrieved from the Internet: URL:http://blog.lastpass.com/2012/01/new-years-resolutions-with-lastpass-3.html [retrieved on Sep. 20, 2013].

Anonymous, "Stop Using the Same Key for Every Lock!", LastPass, Jul. 16, 2012, XP002713291. Retrieved from the Internet: URL:http://blog.lastpass.com/2012/07/stop-using-same-key-for-every-lock.html [retrieved on Sep. 20, 2013].

Anonymous, "Increase the Security of Your LastPass Account with Two New Options", LastPass, Aug. 1, 2012, XP002713292. Retrieved from the Internet: URL:http://blog.lastpass.com/2012/08/increase-security-of-your-lastpass.html [retrieved on Sep. 20, 2013].

Anonymous, "The LastPass Autofill Menu in Chrome Gets a New Look!", LastPass, Sep. 28, 2012, XP002713293. Retrieved from the Internet: URL:http://blog.lastpass.com/2012/09/the-lastpass-autofill-menu-in-chrome.html [retrieved on Sep. 20, 2013].

Extended European Search Report. European Patent Application No. 13167377.4. Dated: Oct. 17, 2013.

ManageEngine, "Password Alerts, Notifications & SIEM Integration", Zoho Corporation Pvt. Ltd., <http://www.manageengine.com/products/passwordmanagerpro/password-notifications.html>, retrieved Mar. 25, 2013.

Apple Inc., "Keychain Services Programming Guide", Apple Inc., dated Jun. 11, 2012.

Felgall, "Password Strength" <http://www.felgall.com/passstrength.htm>, retrieved May 6, 2013.

King, First Office Action for U.S. Appl. No. 13/891,627, mailed Apr. 10, 2015.

* cited by examiner

METHODS AND DEVICES FOR DETECTING UNAUTHORIZED ACCESS TO CREDENTIALS OF A CREDENTIAL STORE

FIELD

Embodiments described herein relate generally to controlling access to stored credentials (e.g. passwords) by applications executing on a computing device.

BACKGROUND

A device may access a variety of different websites through a web browser. Some of these websites may control access to services and data by requiring users to set up an account and to complete a login process, which typically involves supplying an appropriate username and password. These websites may include social media sites, e-mail or other messaging services sites, photo sharing sites, online shopping sites, banking sites, sites that provide access to corporate or other data servers, and so on.

Some applications, including web browser applications for example, will allow login data such as usernames and passwords to be saved on users' computing devices. This may enhance user convenience as users need not memorize or manually enter login data for different accounts. Users may choose to configure their applications to retrieve stored login data and populate corresponding input fields automatically when the user is prompted for this data (e.g. in a web browser).

BRIEF DESCRIPTION OF THE DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

Figure 1:
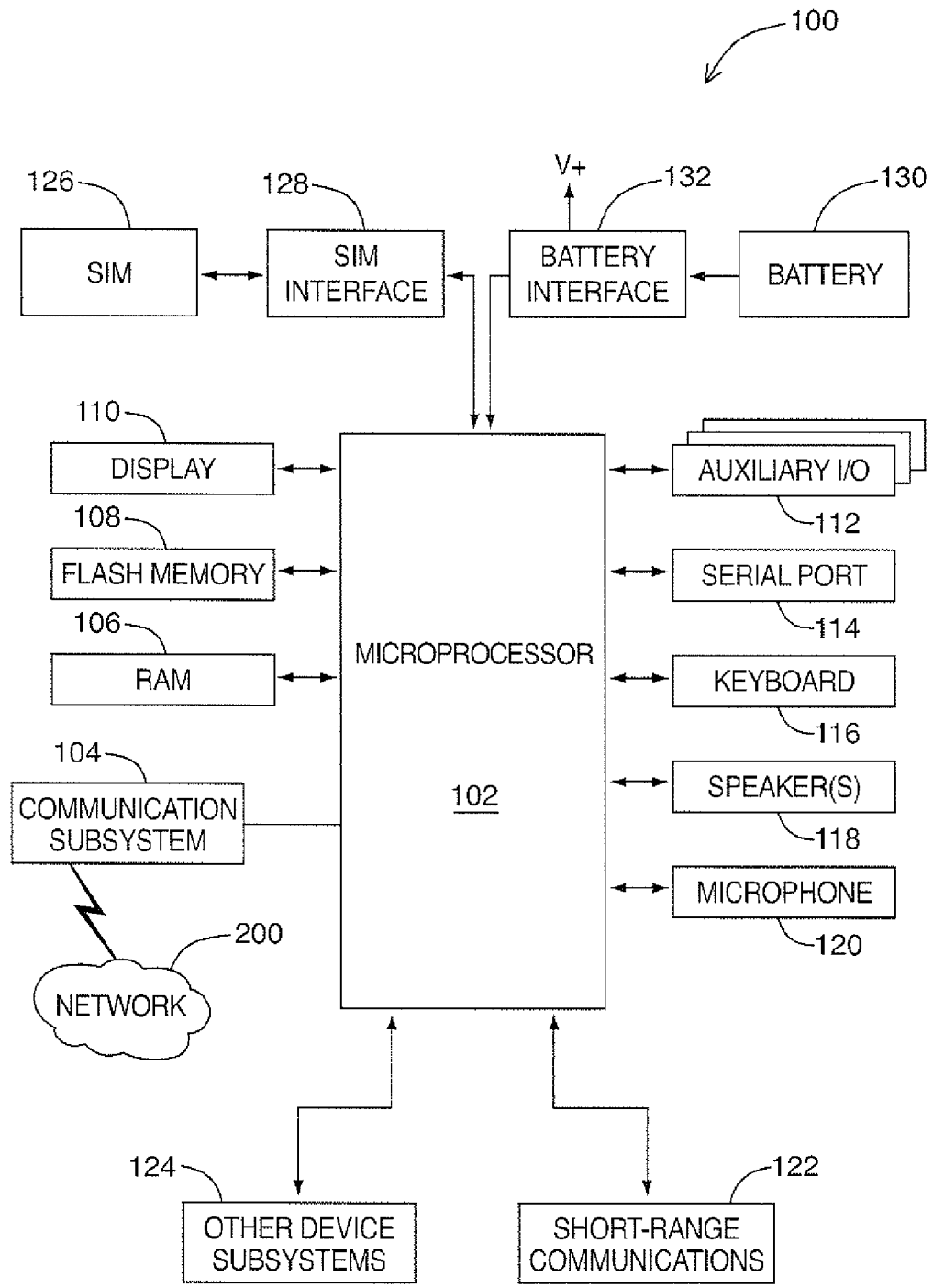
FIG. 1 is a block diagram of a mobile device in one example implementation.

To enhance security for stored login data on a computing device, a keyring application or service may be employed. A keyring may also be referred to as a keychain, a password store or password manager, a wallet, or more generally, a credential store or credential manager. A keyring may allow for the secure storage of data such as usernames, passwords, cryptographic (e.g. encryption) keys, access codes, digital certificates, and other secure data items, for multiple applications and services, typically by storing the data in encrypted form. In some keyring implementations, a user may need to enter a separate password that has been specifically assigned to the keyring in order to unlock the keyring (i.e. allow access to data stored by the keyring).

While the keyring is unlocked, certain applications (e.g. potentially restricted to those applications considered trustworthy by the user) may be permitted access to data stored by the keyring. Accordingly, a user need not login separately to services for which passwords are stored in an unlocked keyring, since any application that is permitted access to the corresponding login data in the unlocked keyring may automatically retrieve that login data to authenticate the user for those services.

While user convenience may be enhanced by allowing data such as usernames and passwords to be stored on the computing device, there are potential security risks, particularly if an application that has been given access to that data becomes compromised. In particular, if credentials stored on the computing device are readily accessible to a compromised application, all of the credentials may be stolen, unbeknownst to the user of the computing device. Even if a keyring application is used to store the credentials more securely, a compromised application may have already been authorized to use the keyring (e.g. the user has already identified the application as trusted), and accordingly, any credentials accessible by the application may be stolen.

Typically, one or more credentials associated with a specific application or service will be accessed in direct response to a particular login attempt by a user. For example, when the user wishes to access an e-mail account using a web browser, the user will navigate to a login page provided by the e-mail service, and if the username and password for the account has been saved on the computing device, these credentials will be retrieved from storage by the web browser. The web browser will then automatically populate the corresponding input fields with the retrieved data, and the user may then proceed with the login process for the e-mail service.

In practice, situations in which a user may attempt to login to multiple different accounts within a very short period of time are highly unusual. For example, although a user may wish to login to accounts of an e-mail service, a social media service, or a banking service in a single session, it may be unlikely that the user would attempt to login to all of these services within the span of several seconds, for example.

At least some embodiments described herein generally relate to methods that permit detection of unauthorized access to credentials (e.g. passwords) of a credential store on a computing device. When credentials for several different services are retrieved from a credential store within a short period of time, this may suggest that unauthorized access to the credential store has occurred. For example, a compromised application may be attempting to surreptitiously acquire all of a user's personal data that might be stored in the credential store.

In one broad aspect, there is provided a method of detecting unauthorized access to credentials of a credential store on a computing device, the method comprising: monitoring a plurality of credentials of the credential store accessed within a period associated with a first setting; and responsive to determining that a number of credentials accessed within the period exceeds a threshold associated with a second setting, outputting, in a user interface, an indication of unauthorized access to the credential store.

In some embodiments, each of the credentials accessed within the period is associated with a different user account.

In some embodiments, the method further comprises restricting access to one or more credentials of the credential store in response to determining that the number of credentials accessed within the period exceeds the threshold associated with the second setting.

In some embodiments, at least one of the credentials accessed within the period comprises a password. In some embodiments, at least one of the credentials accessed within the period comprises at least one of: a digital certificate, a cryptographic key, a username, an access code, or a secure data item. In some embodiments, the credentials comprise at least one of an identifier or an authentication token.

In some embodiments, one or more of the plurality of credentials are stored in encrypted form. In some embodiments, the method further comprises decrypting a requested credential when access to the requested credential is provided.

In some embodiments, the method further comprises receiving a request for at least one credential of the plurality of credentials within the period, and providing access to the at least one credential. In some embodiments, the request is received by a keyring application, wherein the request is received from a requesting application that is different from the keyring application.

In some embodiments, the requesting application is a browser application.

In some embodiments, the method further comprises denying the requesting application access to further credentials in the credential store in response to determining that the number of credentials accessed within the period exceeds the threshold associated with the second setting.

In some embodiments, the first setting is user-configurable. In some embodiments, the first setting is defined by a security policy governing operation of the computing device.

In some embodiments, the period associated with the first setting is defined by a time interval. In some embodiments, the period associated with the first setting is defined by a duration of an event.

In some embodiments, the second setting is user-configurable. In some embodiments, the second setting is defined by a security policy governing operation of the computing device.

In some embodiments, the monitoring comprises recording an identity of each of the plurality of credentials accessed within the period.

In some embodiments, the method further comprises prompting for user input as to whether access to the credential store is unauthorized, in response to determining that the number of credentials accessed within the period exceeds the threshold associated with the second setting; wherein the indication of unauthorized access to the credential store is output in the user interface after user input indicating that the access to the credential store is unauthorized has been received at the computing device.

In some embodiments, the outputting comprises providing a description of at least one of the credentials accessed within the period associated with the first setting. In some embodiments, the at least one credential is identified in a notification displayed on a display.

In some embodiments, the outputting further comprises directing a user of the computing device to take an action to protect the at least one credential.

In some embodiments, at least one credential of the plurality of credentials comprises a password, and the method further comprises changing the password of each of the at least one credential to a new password. In some embodiments, the method further comprises changing at least one additional credential in the credential store to the new password, wherein each of the at least one additional credential comprises a password that corresponds to the password of the at least one credential.

In another broad aspect, there is provided a computing device programmed to detect unauthorized access to credentials of a credential store, the computing device comprising a processor configured to monitor a plurality of credentials of the credential store accessed within a period associated with a first setting; and responsive to determining that a number of credentials accessed within the period exceeds a threshold associated with a second setting, output, in a user interface, an indication of unauthorized access to the credential store.

In another broad aspect, there is provided a computer-readable storage medium comprising executable instructions for programming a computing device to detect unauthorized access to credentials of a credential store, the instructions configuring a processor of the computing device to: monitor a plurality of credentials of the credential store accessed within a period associated with a first setting; and responsive to determining that a number of credentials accessed within the period exceeds a threshold associated with a second setting, output, in a user interface, an indication of unauthorized access to the credential store.

Reference is made to a mobile device in FIG. 1 for illustration purposes. At least some embodiments described herein may be more generally applicable to other electronic devices, which may or may not have voice communication capabilities. Furthermore, embodiments described herein may be generally applicable to other computing devices, including desktop computing devices, laptop computing devices, netbooks, tablet computing devices, etc.

FIG. 1 illustrates an example structure of a mobile device and how the mobile device may operate and communicates with other devices. The mobile device (sometimes referred to alternatively as a "mobile station" or a "portable electronic device") may comprise a two-way communication device with advanced data communication capabilities having the capability to communicate with other computer systems and devices. The mobile device may include the capability for voice communications, data communications or a combination of the two. Depending on the functionality provided by the mobile device, it may be referred to as a smartphone, a data messaging device, a two-way pager, a cellular telephone with data messaging capabilities, a wireless Internet appliance, a laptop computer, a tablet computer, a media player (such as an MP3 player), an electronic book reader or a data communication device (with or without telephony capabilities).

In the example of FIG. 1, a block diagram of a mobile device is shown generally as 100. Mobile device 100 comprises a number of components, the controlling component typically being microprocessor 102. Microprocessor 102 controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 may be configured for cellular communication in accordance with the Global System for Mobile Communication (GSM) and General Packet Radio Services (GPRS) standards. Other standards such as Enhanced Data GSM Environment (EDGE) and Universal Mobile Telecommunications Service (UMTS) may be employed. These standards are mentioned as examples only, and other standards may be employed on computing devices to which embodiments described herein are applied. The described embodiments are intended to use any other suitable standards that are developed in the future.

In this example implementation, the wireless link connecting communication subsystem 104 with network 200 represents one or more different Radio Frequency (RF) channels, operating according to defined protocols specified for GSM/GPRS communications. With newer network protocols, these channels are capable of supporting both circuit-switched voice communications and packet-switched data communications.

The wireless network associated with mobile device 100 may comprise a GSM/GPRS wireless network in one example implementation of mobile device 100; however, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and n-generation (e.g. 2.5G, 3G, 3.5G, 4G, etc.) networks like EDGE, UMTS, High-Speed Downlink Packet Access (HSDPA), High-Speed Uplink Packet Access (HSUPA), High-Speed Packet Access (HSPA), and Long Term Evolution (LTE), etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 typically also interacts with additional subsystems such as a Random Access Memory (RAM) 106, flash memory 108, display 110, auxiliary input/output (I/O) subsystem 112, serial port 114, keyboard 116, one or more speakers 118, microphone 120, short-range communication subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications (e.g. illustrated as applications 400 in FIG. 2), or parts thereof, may be temporarily loaded into a volatile store such as RAM 106.

In some embodiments, mobile device 100 may send and receive communication signals over network 200 typically after network registration or activation procedures have been completed. Network access is generally associated with a subscriber or user of a mobile device 100. To identify a subscriber, mobile device 100 may require a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 would typically not be fully operational for communication with network 200.

By inserting SIM 126 into SIM interface 128, a subscriber can access subscribed services. Services could include, for example: web browsing and messaging such as e-mail, voice mail, Short Message Service (SMS), media transfers (such as music downloading or streaming), and Multimedia Messaging Services (MMS). More advanced services may include, for example: point of sale, field service and sales force automation. SIM 126 may include its own processor and memory for storing information. Once SIM 126 is inserted in SIM interface 128, it is coupled to microprocessor 102. In order to identify the subscriber, SIM 126 contains some user parameters, such as an International Mobile Subscriber Identity (IMSI) for example. An advantage of using SIM 126 is that subscribers are not necessarily bound by any single physical mobile device. SIM 126 may store additional subscriber information for a mobile device as well, including datebook (or calendar) information and recent call information. In certain embodiments SIM 126 may be a different type of user identifier and may be integral to mobile device 100 or not present at all. By way of further examples, a Universal Integrated Circuit Card (UICC), eUICC (Embedded UICC), Removable User Identify Module (R-UIM), CDMA Subscriber Identify Module (CSIM), or Universal Subscriber Identify Module (USIM) may be employed.

Mobile device 100 includes a power pack that supplies power to electronic components and that supports portability. The power pack may be of any type, but for clarity it will be assumed that mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100. In variant implementations, the mobile device 100 may be solar-powered.

Microprocessor 102, in addition to its operating system functions, enables execution of software applications on mobile device 100. A set of applications that control basic device operations, including data and voice communication applications, will normally be installed in flash memory 108 (or other non-volatile storage) on mobile device 100 during its manufacture.

Additional applications (see e.g. applications 400 in FIG. 2) may also be loaded onto mobile device 100 through network 200, auxiliary I/O subsystem 112, serial port 114, short-range communications subsystem 122, or the other device subsystems 124. This flexibility in application installation increases the functionality of mobile device 100 and may provide enhanced on-device functions, communication-related functions, or both. For example, secure communication applications may enable electronic commerce functions and other such financial transactions to be performed using mobile device 100. Numerous other types of applications may be loaded onto mobile device 100 or other computing devices, including without limitation, messaging applications (e.g. e-mail, text, instant, video, etc.), voice communication applications, calendar applications, address book applications, utility applications, browser application, media player (e.g. audio, video, etc.) applications, social network applications, camera applications, gaming applications, productivity applications, etc. The functionality of any number of these applications may also be integrated into or accessed via a single application. For example, messaging services, social networking services, and banking services may be accessed via one application (e.g. a browser application).

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

It should be noted that the term "download" and forms thereof, are used generally herein to describe a transfer of data from one system to another, and is not intended to be limiting with regards to the origin or destination of the transfer, for example. Accordingly, where the term "download" and forms thereof are used in the specification and in the claims, it is intended to encompass other forms of transfers including, for example, an "upload" or a "sideload" of data (e.g. a Universal Serial Bus (USB) sideload).

Short-range communications subsystem 122 provides for wireless device connections to enable communication between mobile device 100 and different systems or devices, without the use of network 200. For example, subsystem 122 may include an infrared device and associated circuits and components for short-range communication. Examples of short range communication would include standards developed by the Infrared Data Association (IrDA), Near Field Communication (NFC), Bluetooth, and the 802.11 family of standards developed by IEEE (e.g. Wifi).

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, infrared fingerprint detector, or a roller wheel with a dynamic button pressing capability. Further, auxiliary I/O subsystem 112 may comprise a two-dimensional navigation (or scrolling) component, such as a track ball, a joystick or a directional pad, each optionally with a dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to the one or more speakers 118, and signals for transmission would be generated by microphone 120. Alternative voice or audio I/O subsystems, such as a voice message recording subsystem, may also be implemented on mobile device 100. Although voice or other audio signal output is accomplished primarily through the one or more speakers 118, display 110 may also be used to provide additional information such as the identity of a calling party, duration of a voice call, or other voice call related information. Microphone 120 can receive a supply of power, in the form of a bias voltage and bias current, from the rechargeable battery 130. Different types and configurations of microphone 120 can be incorporated into the mobile device 100.

Figure 2:
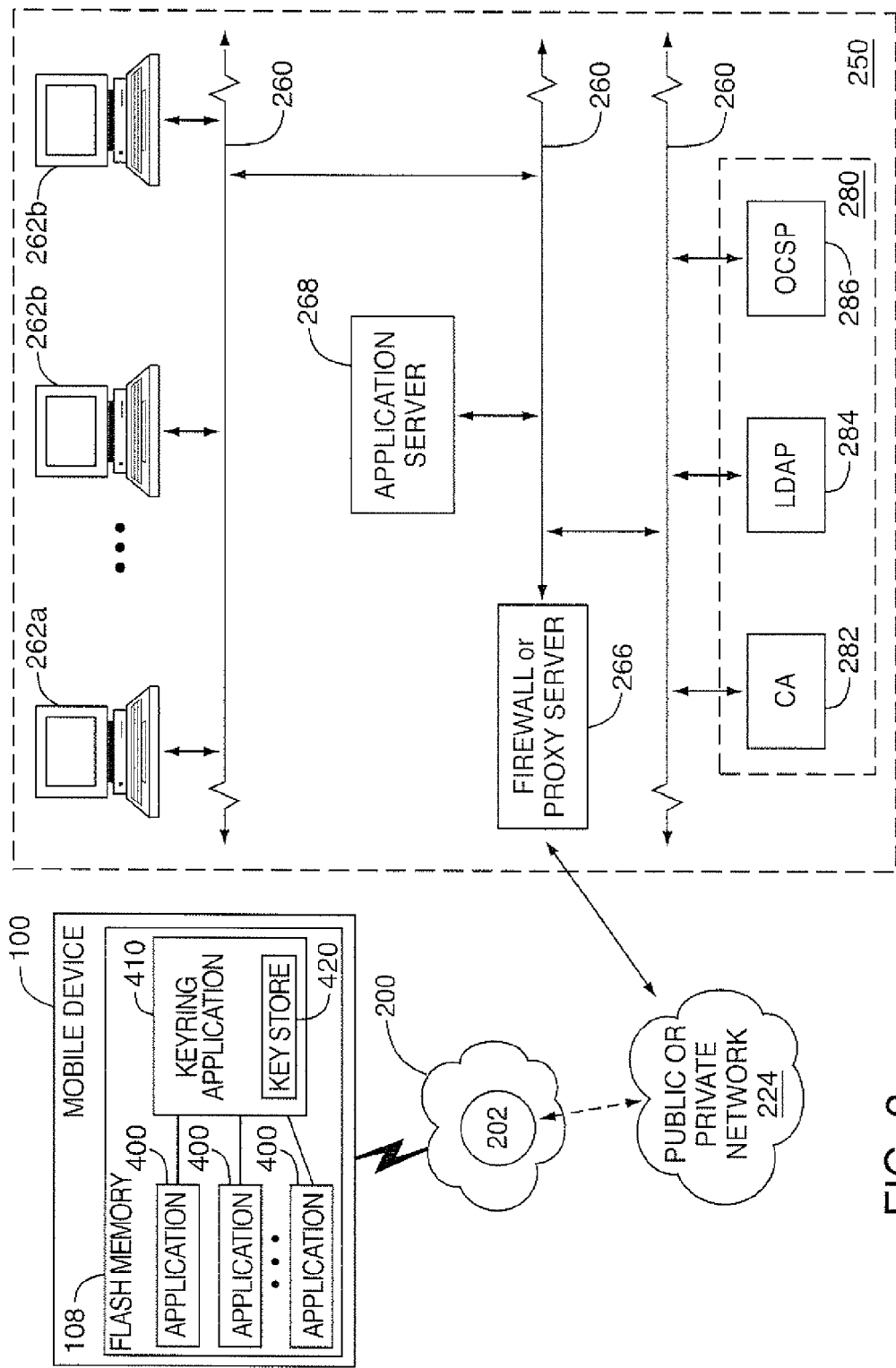
FIG. 2 is a block diagram illustrating components of a host system in one example configuration.

Referring now to FIG. 2, a block diagram illustrating components of a host system in one example configuration is shown. Host system 250 will typically be a corporate office or other local area network (LAN), but may instead be a home office computer or some other private system, for example, in variant implementations. In this example shown in FIG. 2, host system 250 is depicted as a LAN of an organization to which a user of mobile device 100 belongs.

LAN 250 comprises a number of network components connected to each other by LAN connections 260. For instance, a user's desktop computer 262a may be situated on LAN 250. Mobile device 100 may be coupled to computer 262a by a serial or a USB connection, for example. Other user computers 262b may also be situated on LAN 250. Information (e.g. PIM data, private symmetric encryption keys to facilitate secure communications between mobile device 100 and LAN 250) may be loaded from user computer 262a to mobile device 100, and this may include information loaded to mobile device 100 during an initialization of mobile device 100 for use. The information loaded to mobile device 100 may include certificates used in the exchange of messages. User computers 262a, 262b will typically be also connected to other peripheral devices not explicitly shown in FIG. 2.

Embodiments described herein relate generally to detecting unauthorized access to credentials in a credential store (e.g. key store 420) by applications (e.g. 400). Accordingly, only a subset of network components of LAN 250 are shown in FIG. 2 for ease of exposition, and LAN 250 will typically comprise additional components not explicitly shown in FIG. 2. More generally, LAN 250 may represent a smaller part of a larger network [not shown] of the organization, and may comprise different components and/or be arranged in different topologies than that shown in the example of FIG. 2.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. Use of a wireless VPN router implies that a VPN connection can be established directly through a specific wireless network to mobile device 100. A wireless VPN router may be an off-the-shelf VPN component, not requiring a separate wireless gateway and separate wireless infrastructure to be used. A VPN connection may be a Transmission Control Protocol (TCP)/IP or User Datagram Protocol (UDP)/IP connection that delivers messages directly to mobile device 100.

Secure communication protocols rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a session key may be generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature generally comprises a digest of the message (e.g. a hash of the message) encrypted using the sender's private key, which can then be appended to the outgoing message. To verify the signature of the message when received, the recipient uses the same technique as the sender (e.g. using the same standard hash algorithm) to obtain a digest of the received message. The recipient also uses the sender's public key to decrypt the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations may be validated using certificates. A certificate is a digital document typically issued by a certificate authority (CA). Certificates are used to authenticate the association between users and their public keys, and essentially, provides a level of trust in the authenticity of the users' public keys. Certificates may contain information about the certificate holder, with certificate contents typically formatted in accordance with an accepted standard (e.g. X.509).

For a public key to be trusted, its issuing organization must be trusted. The relationship between a trusted CA and a user's public key may be represented by a series of related certificates, also referred to as a certificate chain. The certificate chain can be followed to determine the validity of a certificate.

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 2, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server (not shown). Similarly, the mobile data server may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with a security policy governing the operation of the mobile device (e.g. an IT policy), for example.

Other sources of certificates [not shown] may include a Windows certificate store, another secure certificate store on or outside LAN 250, and smart cards, for example.

Applications 400 executable on a mobile device 100 may be stored on an application server 268. Application server 268 may be coupled or otherwise have access to an application database [not shown] that stores applications 400, for download to and execution on the mobile device 100. To have access to the applications 400 stored on the application server 268, each user may have a user account managed by the application server 268. Access to the application server 268 may be provided via a client application operating on mobile device 100, although in variant embodiments, access to the application server may be provided through a web browser, for example.

As illustrated, the application server 268 may be an internal network server of the host system 250 that is used to store applications 400 to be deployed to the organization's mobile devices 100. In a variant embodiment, the application server 268 may additionally or alternatively provide an application store or application market that is accessible from the mobile device 100. The application store may allow users of a mobile device 100 to search for, purchase, and download applications 400 to their mobile device 100. In some embodiments, the application server 268 may reside outside of the host system 250, on a remote system accessible via the public or private network 224, for example.

For ease of understanding the described embodiments, FIG. 2 further illustrates a simplified view of a subset of components of the mobile device 100 described above. The mobile device 100 may run software applications 400 (sometimes referred to simply as "apps") that access computing resources on the mobile device 100. As described earlier, applications 400 may provide access to a variety of services to the user of mobile device 100. The applications may be stored in the flash memory 108 of the mobile device 100 or other persistent store, and may access computing resources available on the mobile device 100 when executed. Access may be in the form of the applications invoking application programming interfaces (APIs) made available by the operating access to access the computing resources, for example.

A keyring application 410 (more generally referred to as a "keyring" herein) may also be provided on mobile device 100. Keyring 410 allows data to be stored in an associated secure data store (e.g., key store 420), and in this regard, the term "keyring" may also be used to refer generally to a structure in which the data is securely stored. The data stored in the keyring may reside, for example, on mobile device 100 in flash memory 108, on mobile device 100 in some other memory, on a device physically coupled to the mobile device 100, on a device remote from the mobile device 100, or distributed amongst some combination of these memories and devices.

As previously noted, keyring 410 may also be referred to as a keychain, a password store or password manager, a wallet, or more generally, a credential store or credential manager. Keyring 410 generally allows for the secure storage of data, particularly credentials that a user may wish to store securely (e.g. usernames, passwords, cryptographic (e.g. encryption) keys, access codes, digital certificates, and other secure data items), for multiple applications and services, typically by storing the data in encrypted form.

In some implementations, a user may need to enter a separate keyring password that has been specifically assigned to keyring 410 in order to unlock keyring 410 (i.e. to allow access to the data stored by keyring 410). In variant implementations, the user may not need to enter a keyring password.

While keyring 410 is locked, access to the contents of keyring 410 (and therefore of key store 420) is restricted; once the keyring is unlocked, however, one or more applications 400 may be permitted access to the contents of keyring 410 (i.e. to contents of key store 420 in the example).

In certain implementations, while keyring 410 is unlocked, a given application 400 may be permitted access only to contents of keyring 410 that it had directed keyring 410 to store; in other words, the given application 400 may access its own keyring items, but not data items stored in keyring 410 by any other application. In variant implementations, once keyring 410 is unlocked, any application may access any data items stored in keyring 410, even those created by and/or stored for other applications. In some implementations, a user must explicitly indicate that a given application 400 is trusted before it may be allowed access to the contents of keyring 410.

By way of illustration, consider the situation in which multiple credentials, each associated with a different account (and therefore typically associated with a different service) are accessed from keyring 410. This may be the result of a user of mobile device 100 legitimately attempting to login to multiple accounts. For example, the user may wish to login to an e-mail account to check messages. The user may then decide to login to an account on a social media site to browse posts. Subsequently, the user may attempt to login to a banking site to perform online banking activities. The user may login to these three services in the same sitting, possibly using separate applications 400 for each task, two different applications 400, or a single application 400 (e.g. a browser application, if all services are accessible via a network), depending on the applications 400 installed on mobile device 100 and user preference.

In this example, logging into the three accounts may result in three different sets of usernames and passwords being retrieved from keyring 410. The actual usernames and/or passwords of each set may or may not be identical, depending on the usernames and passwords that the user has chosen for use with each of the different accounts.

If the retrieval of the usernames and passwords from keyring 410 is the result of a user's legitimate login attempts, it is possible—but unlikely—that the attempts would be made within a very short period of time. For example, it is unlikely that a user would attempt to login to all three accounts within one minute, as it would typically take longer for the user to navigate to each login page in sequence, and as the user would likely perform some type of activity with respect to one account before accessing a different account.

In general, when credentials for several different accounts or services are accessed from keyring 410 by one or more applications within a short period of time, this may suggest that the accesses to keyring 410 are unauthorized and not the result of legitimate login attempts by the user. Rather, the accesses might have been initiated by a compromised application or by a remote attacker, in order to retrieve credentials stored in keyring 410 without the user's knowledge, for example.

Another factor that may suggest that certain accesses to keyring 410 may be unauthorized is when a large number of credentials for different accounts or services are retrieved from keyring 410 within a given period. For example, if passwords for 10 different accounts are retrieved from the keyring within a period of three minutes, it may be less likely that a user has legitimately logged in to all of these accounts during this time, and more likely that a compromised application or a remote attacker is attempting to steal all of the user's credentials from keyring 410.

At least some embodiments described herein generally relate to methods that permit detection of unauthorized access to credentials of a credential store on a computing device, based on a period of time in which multiple credentials are retrieved from the credential store, and/or a number of different accounts or services for which credentials are retrieved from the credential store.

Figure 3:
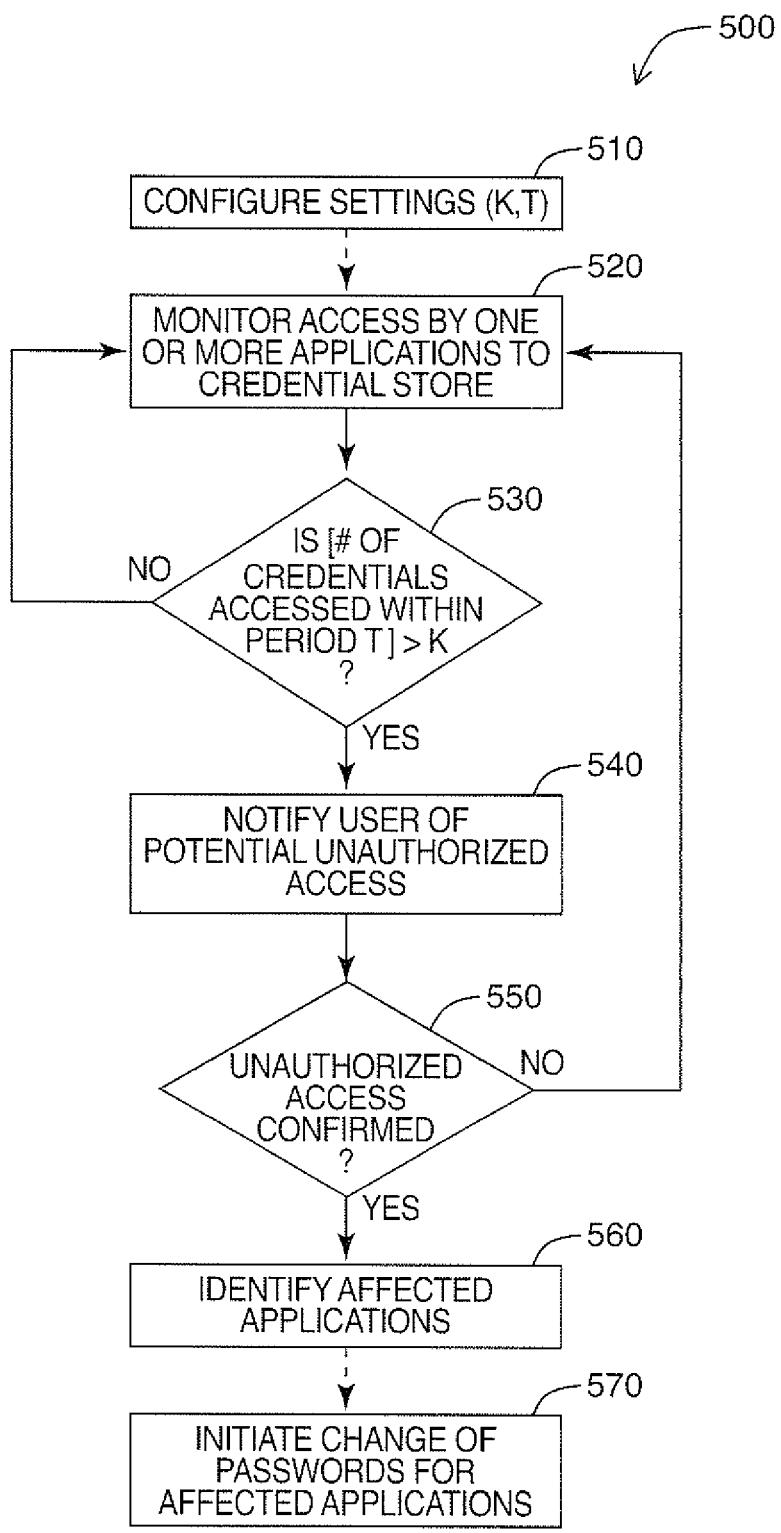
FIG. 3 is a flowchart diagram illustrating a method of detecting unauthorized access to credentials of a credential store, in accordance with at least one embodiment.

Referring now to FIG. 3, a flowchart diagram illustrating a method of detecting unauthorized access to credentials of a credential store in accordance with at least one embodiment is shown generally as 500. Acts of method 500 may be performed by a processor of a computing device, which may be a mobile device (e.g. by microprocessor 102 of mobile device 100 in FIG. 1). In one embodiment, an application for managing the credential store (e.g. keyring application 410 of FIG. 2) configures the processor to perform method 500.

At 510, a first setting (T) and a second setting (K) are set on the computing device. In one embodiment, these are configurable settings provided by a keyring application (e.g. keyring 410 of FIG. 2). These settings may be initially set upon an initial installation of the keyring application, or upon an initial setup or provisioning of the computing device, for example. These settings may also be initially set and/or subsequently updated at some other point in time.

A period of time is associated with the first setting T, which in one embodiment, may be user-configurable (e.g. by modifying properties via a user interface generated by the keyring application). In another embodiment, the first setting T may be defined by a security policy governing operation of the computing device (e.g. an IT policy, potentially by an IT administrator). The security policy may or may not permit users to subsequently override the first setting T as defined by the security policy.

In one embodiment, the period of time associated with the first setting T is defined by a time interval. For example, the first setting T may be defined as 5 seconds, 15 seconds, 30 seconds, 45 seconds, 1 minute, 90 seconds, 2 minutes, or 3 minutes, as examples.

In variant embodiments, the period of time associated with the first setting T may be defined by a duration of an event, such as the time during which a window of a specified application remains open, the time during which a user is logged into the account of a specified service, the time during which an input device has not been user-actuated, the time during which an output device is in 'sleep' mode, or the time during which a particular program is executing on the computing device, as examples.

A number of credentials (or of sets of credentials, such as a username/password pair) is associated with the second setting K, which in one embodiment, may be user-configurable (e.g. by modifying properties via a user interface generated by a keyring application). In another embodiment, the second setting K may be defined by a security policy governing operation of the computing device (e.g. an IT policy, potentially by an IT administrator). The security policy may or may not permit users to subsequently override the second setting K as defined by the security policy.

At 520, access to credentials of the credential store (e.g. to passwords in key store 420 of keyring 410) by one or more applications within the period of time associated with the first setting T is monitored. In one embodiment, an identity of each credential that is accessed within the period is recorded in memory (e.g. flash memory 104) so that these credentials may be later identified if it is determined that the access within this period of time was unauthorized.

For example, if T is set to one minute, the identity of all credentials accessed within at least the past minute may be recorded in memory. In one embodiment, a different setting may also be configured that defines a longer period of time for which a log of recorded monitored data is to be retained in memory. For instance, a record of all credentials accessed within the past 24 hours may be retained in memory, and this record may be used to assess the number of credentials accessed within any given one-minute period. The longer period of time may or may not include periods when one or more specified applications (e.g. a browser application) are idle or not running. In variant embodiments, the record of credentials for one or more applications may be cleared from memory once execution of the one or more applications is terminated (e.g. upon closing of the browser application).

Various credentials of different types, including usernames, passwords, cryptographic (e.g. encryption) keys, access codes, digital certificates, and/or other secure data items may be stored in the credential store. The credentials to which access is monitored at 520 may include one type of credentials, all types of credentials, or some combination of the above. For example, in one embodiment, only access to passwords stored in the credential store by the one or more applications are monitored. In another embodiment, access to both usernames and passwords stored in the credential store are monitored.

More generally, credentials may comprise identifiers and/or authentication tokens, as well as other data to be secured. Identifiers are typically used to distinguish between different users or user accounts, and may be generally referred to as usernames. However, identifiers are not limited to "names" per se, and may include without limitation: e-mail addresses, account numbers (e.g. frequent flyer numbers, bank account numbers, credit card numbers, gift card numbers, loyalty card numbers, etc.), social security numbers, social insurance numbers, passport numbers, driver license numbers, etc. Authentication tokens are used to authenticate a user, and are intended to be known only by the user or are otherwise unique to the user. The authentication token is typically provided in associated with a corresponding identifier when authenticating the user. Authentication tokens may be generically referred to as passwords; however, authentication tokens are not limited to "words" per se, and may include without limitation: passcodes, personal identification numbers (PIN), image data, biometric data, gestures, etc.

While accesses to the credential store are monitored at 520, requests for at least one credentials may be received, by the keyring application for example. The request may be received from a requesting application that is different from the keyring application (e.g. from a browser application). The keyring application may provide the requesting application with the requested credential (e.g. password) if the requesting application is authorized to retrieve the requested credential. Determining whether the requesting application is authorized to retrieve the requested credential may comprise determining that the user has previously identified the requesting application as trusted. The user may be prompted to identify the requesting application as being trusted, in response to a given request. The user may be prompted to unlock the keyring by entering the correct keyring password (e.g. as provided during configuration of the keyring, act not shown).

The credentials stored in the credential store are typically stored in encrypted form. When access to a credential in the credential store is requested by a requesting application and subsequently retrieved by the keyring application, the requested credential may need to be decrypted before it is provided to the requesting application. In some embodiments, the requested credential may already be available in decrypted form (e.g. in a cache) for retrieval.

At 530, a determination is made as to whether the number of credentials of the credential store that has been accessed within a period associated with the first setting T exceeds a threshold associated with the second setting K.

By way of example, at 530, a determination may be made as to whether three or more passwords have been accessed from the credential store within the past minute. As a further example, a determination may be made as to whether ten or more passwords have been accessed from the credential store within the past three minutes.

The determination may be made periodically by repeating 530 (e.g. with a frequency that is dependent on T or some other frequency, which may be configurable by a user and/or an administrator), and credentials accessed in with the period immediately preceding the time in which the determination is made are reviewed. In variant implementations, accesses made during some other historical period not immediately preceding the time in which the determination is made may be reviewed.

In one embodiment, each of the credentials that are counted in the determination at 530 is associated with a different user account. Each user account may be associated with a different service.

In variant embodiments, multiple instances of the first setting T and second setting K may be set, and the determination made at 530 may be repeated for different setting pairs. Potential unauthorized access to credentials of the credential store may be flagged by different types of suspicious behavior, which may include retrieving numerous credentials within a very short period of time, or a very large number of credentials over a longer period of time, as examples. It may be desirable to check for both of these occurrences. For example, a first determination may be made as to whether three or more passwords have been accessed from the credential store within the past minute, and a further determination may be made as to whether ten or more passwords have been accessed from the credential store within the past three minutes.

Determining that the number of credentials of the credential store that has been accessed within a period associated with the first setting T exceeds a threshold associated with the second setting K may comprise confirming that the number is strictly greater than a set value of K (i.e. >K) or that the number is greater or equal to the set value of K (i.e. >=K), depending upon the particular implementation. In variant implementations, K may be associated with a range of values.

If, at 530, the number of credentials of the credential store that has been accessed within the period associated with the first setting T is not determined to exceed the threshold associated with the second setting K, the flow of method 500 returns to 520, wherein monitoring of the credential store continues.

On the other hand, if the number of credentials of the credential store that has been accessed within the period associated with the first setting T is determined to exceed the threshold associated with the second setting K, then in one embodiment, the flow of method 500 proceeds to 540. At 540, a user is notified of potential unauthorized access to the credential store. The user may be prompted for confirmation that access to the credential store is, in fact, unauthorized, in response to determining that the number of credentials accessed within the period associated with the first setting T exceeds the threshold associated with the second setting K. This may be done to recognize that, occasionally, the accesses to the credential store may be legitimate and in direct response to user activities. Accordingly, the user may reject the warning at 550 in that situation, and the flow of method 500 will return to 520, wherein monitoring of the credential store continues. On the other hand, if the user confirms at 550 that the access was unauthorized, the flow of method 500 proceeds to 560.

In variant embodiments, the flow of method 500 may proceed directly from 530 to 560 if the computing device is not configured to prompt users for confirmation of unauthorized access.

At 560, an indication of unauthorized access to the credential store is output to the user of the computing device in a user interface. An indication may be output to other entities (e.g. an administrator), instead of or in addition to the user of the computing device. In one embodiment, this indication may be provided as text in a dialog box. However, other forms of alerts, including other visual, vibrational, or auditory alerts may be provided in variant embodiments.

In one embodiment, a description of at least one of the credentials accessed within the period associated with the first setting K is output at 560. This may be provided in a notification displayed on a display of the computing device. This information allows the user to identify which applications or services may be affected. For example, if it was determined that three passwords were retrieved from the credential store within one minute (and in some embodiments, the user will have confirmed that this was done without the user's consent), an identification of the accounts or services associated with the retrieved passwords is provided to the user.

In one embodiment, the output at 560 may further direct the user of the computing device to take an action to protect the at least one credential for which a description has been output. In the above example, the user may be directed to change the passwords for the identified accounts or services. As a further example, the application(s) for which the at least one credential was retrieved may be identified, and the user may be directed to cease using and uninstall the potentially compromised application(s) from the computing device.

In one embodiment, access to one or more credentials of the credential store by the potentially compromised application(s) may be restricted in response to determining that the number of credentials accessed by the application(s) within the period associated with the first setting T exceeds a threshold associated with the second setting K. This may serve to prevent further credentials from being retrieved from the credential store by a compromised application. For example, a browser application may be denied access to further credentials in the credential store. In this case, when the browser application requests a credential from the credential store, an error message may be returned to the browser application, for example. In variant embodiments, access to the credential store by applications other than the potentially compromised application(s) may be denied once any unauthorized access to the credential store has been detected.

In accordance with at least some embodiments described herein, actions are taken on the computing device (e.g. by the keyring application) that serve not only to warn the user of the unauthorized access to the credential store, but also to prevent potential theft of further credentials in the credential store, and to assist users in repairing damage caused by the unauthorized access (e.g. by directing the user to reset affected passwords).

In a variant embodiment, optionally, a change of the affected passwords may be automatically initiated as shown at 570, to enhance user convenience. For example, this may entail executing a "safe" browser application, and automatically navigating to and displaying the "change password" page for the service associated with an affected password in a web browser.

In some implementations, a trusted server may be maintained (e.g. in LAN 250 of FIG. 2) that contains a set of instructions for each domain that can be executed to allow the keyring application to change the password. The instructions may then be transmitted to the computing device. To enhance security, a secure connection between the trusted server and the computing device can be established (e.g. using certificates, http authentication over SSL, etc.) prior to the transmission of instructions. This may prevent an attacker from posing as the trusted server and transmitting instructions to the computing device.

The instructions transmitted to the computing device may comprise metadata in any one of various forms, such as XML that defines a pre-defined method to change the password, and may include a web page link, or an API link and key, for example. Variant implementations may employ HTTP methods (e.g. post), NTLM messages, etc. In general, any schema that can specify the password change mechanism and necessary parameters, such as the destination server, may be employed.

The instructions may direct the computing device to navigate to a particular address (e.g. mail.mailA.com/password) in order to facilitate the change in password. Furthermore, the trusted server may maintain updates to the address of the "change password" page (e.g. if the address is changed from mail.mailA.com/password to password.mail.mailA.com), and the updated instructions and/or address information may be provided to the computing device. In one implementation, if a password is detected as being compromised, the computing device will request updated instructions and/or address information from the trusted server before attempting to change the password. Updated instructions may alternatively, or additionally, be requested from the trusted server periodically. Requiring the computing device to check for updated instructions with the trusted server may enhance security, as an attacker might otherwise steal the new password if the user is directed to an old link or domain (which may now be compromised and in the control of the attacker) to change the password.

As a further example, a dialog box may be presented on a display of the computing device, and the user may supply a new password to replace an affected password. The keyring application may maintain a list of network addresses (e.g. supplied by a user, by an administrator, or as preset addresses) for a site where a password associated with a given service can be changed, and the keyring application may be configured to automatically change the password for the service to the new password as supplied by the user. In some implementations, the network addresses may be retrieved from a trusted server, as previously noted, or supplied and/or updated via a security policy.

Affected passwords for multiple services may also be changed to the same new password supplied by the user; alternatively, the user may provide a different new password for each of multiple services. As a further example, the new password may be a default replacement password that has been previously set for use by the keyring application, and any affected passwords may be automatically changed to the default replacement password, thereby eliminating the need to request the new password from the user. Service-specific replacement passwords may also be defined in addition to a "global" replacement password; in those implementations, the global replacement password may be utilized for services for which a service-specific replacement password has not been defined.

In a variant embodiment, a change of one or more other passwords stored in the credential store that corresponds to an affected password may also be automatically changed, or a direction to change the other corresponding passwords may be issued to the user. Typically, a given other password will correspond to an affected password if the two passwords match; however, in some implementations, the other password may correspond to the affected password if the two passwords are determined to be substantially similar (e.g. one password includes the entirety of the other password with the addition or deletion of one or more characters, certain characters of one password have been substituted for similar characters in the other password, certain sets of characters in one password have been transposed in the other password, etc.).

Figure 4:
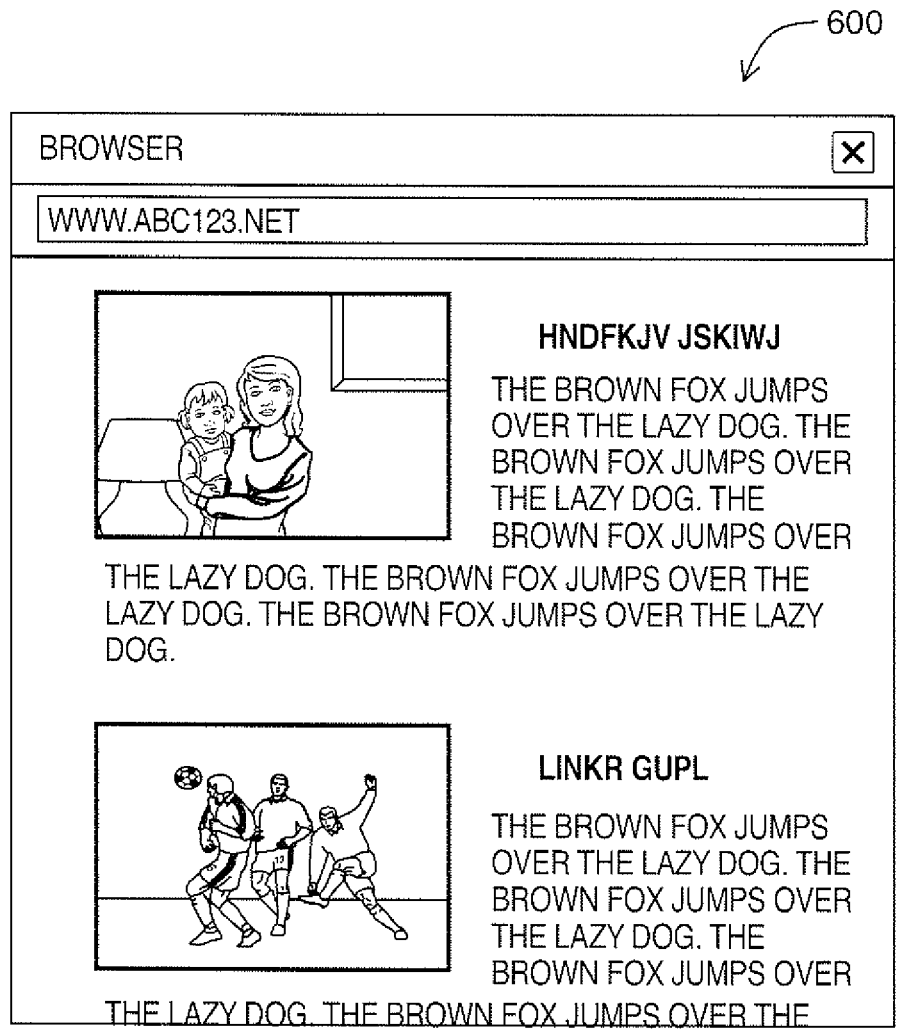
FIG. 4 is an example visual output of a browser in one example implementation.
Figure 5:
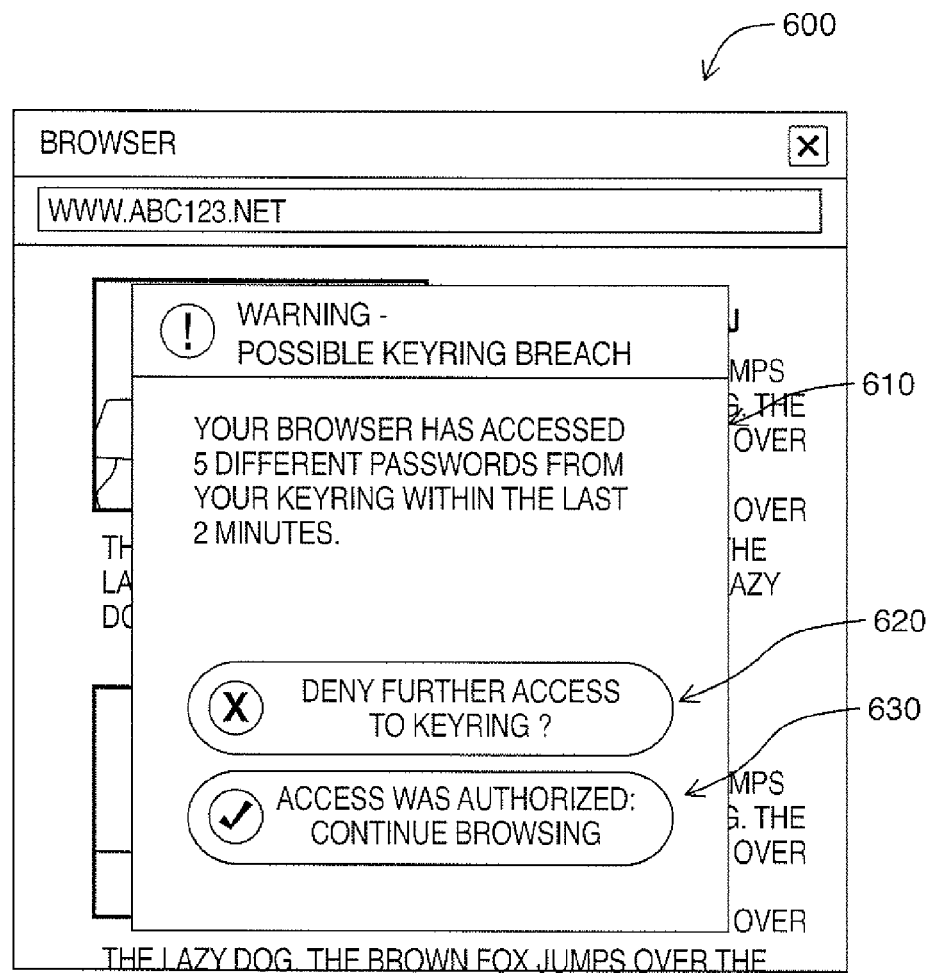
FIG. 5 is an example visual output illustrating a dialog box in one example implementation.
Figure 6:
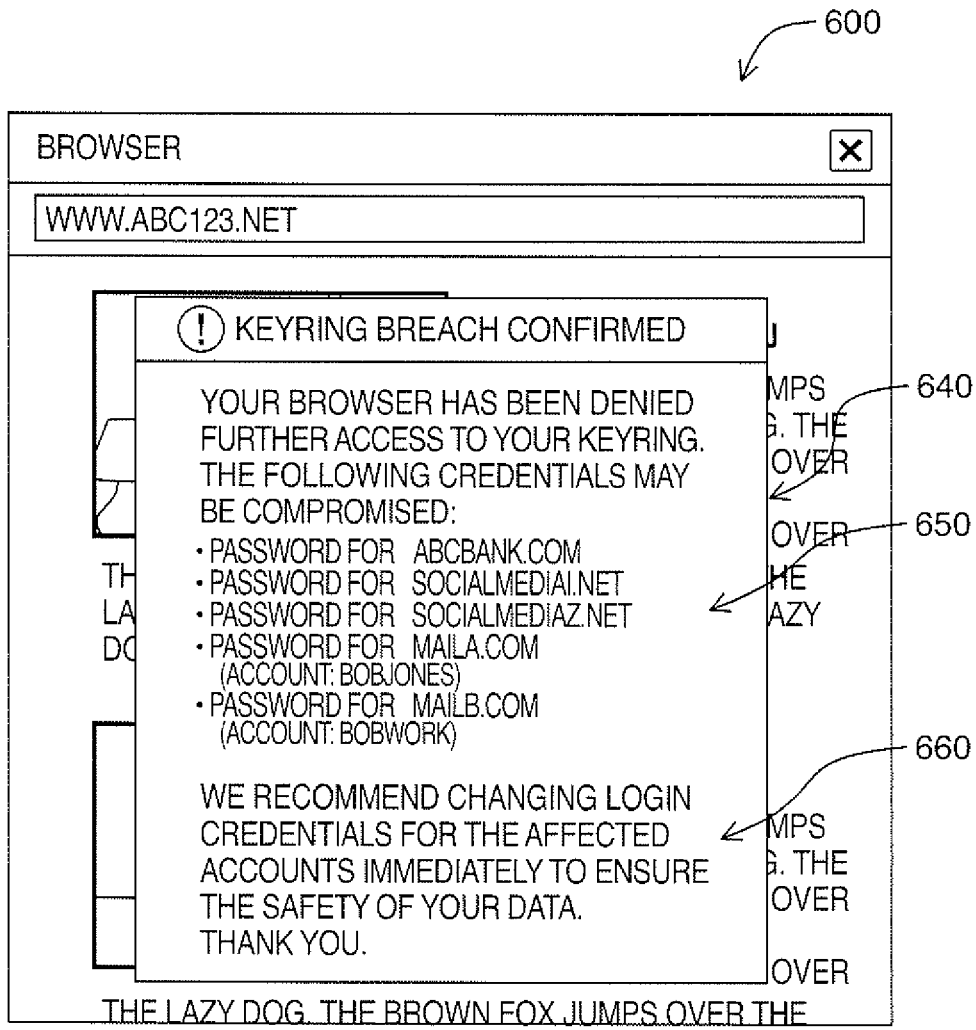
FIG. 6 is an example visual output illustrating another dialog box in one example implementation.

Referring to FIGS. 4 to 6, example visual outputs that may be displayed on a user interface of a computing device are shown in a browser 600. By way of illustration, FIG. 4 shows a browser in normal operation. Unbeknownst to the user, the browser application has been compromised and has been retrieving passwords from the user's keyring without the user's knowledge.

FIG. 5 shows a visual output comprising dialog box 610 displayed by the keyring application, warning of potential unauthorized access to the keyring. The user may be given an option 620 to confirm that the access was not authorized and to deny the browser further access to the key ring, or the option 630 to confirm that the access was, in fact, authorized.

In response to receiving user input indicating that the access was not authorized, a visual output comprising dialog box 640 indicating that unauthorized access to the keyring has occurred may be displayed, as shown in the example visual output of FIG. 6. Dialog box 640 includes information comprising descriptions 650 for each of the affected accounts (or services or applications) associated with the passwords that may now be compromised. Descriptions 650 may also include a description of each affected username or account (e.g. BobJones@MailA.com, BobWork@MailB.com), which may assist the user in identifying the compromised account in the event he may have access to multiple accounts belonging to the same domain, for example. Dialog box 640 may include further information comprising a direction 660 to the user to take action to protect the data in the keyring. In some embodiments, some or all of the information of dialog box 640 may be combined with some or all of the information of dialog box 610 (FIG. 5).

Although embodiments described herein have been primarily described with reference to passwords as credentials for ease of exposition, access to other types of credentials may also be monitored. For example, access to a user's private keys may be monitored. If it is determined that a particular key has been compromised, the user may be directed to obtain a new key and associated certificate, and to have the old key and associated certificate revoked.

In a variant embodiment, an auto-fill function in a user interface of the computing device may be disabled when any password (or other credential) for an account or service that has been identified as potentially being compromised is expected to be received as user input in the user interface. This forces the user to manually enter the password when logging into affected services, and a further warning may be output to the user (e.g. as in 540) to change the password at that time. The auto-fill function may also be disabled whenever any password (or other credential) that corresponds to (e.g. matches or is otherwise similar to) a password for an account or service that has been identified as potentially being compromised is expected to be received as user input in the user interface, even for accounts or services that have not been identified as being compromised. This may enhance security. The auto-fill function may prevent not only a password from being auto-filled for a particular site, but the auto-fill function may be disabled with respect to other accompanying fields as well, including username, personal information fields (e.g. name, address, telephone number, e-mail address), financial information fields (e.g. credit card numbers, account numbers, etc.), and so on.

A number of embodiments described herein have been described with reference to a browser application, by way of illustration. If a browser application has been compromised, at least some of the embodiments described herein may be implemented to detect unauthorized access to a credential store by the browser application. However, at least some of the embodiments described herein may be adapted to detect unauthorized access to a credential store by other applications and processes in variant implements. For example, a process may have multiple plug-ins for various services and have access to the credential store. Typically, each plug-in will request data only for its associated service from the credential store. Accordingly, if a plug-in or process is compromised, unauthorized access to the credential store may be attempted. A user may be alerted to this unauthorized access in accordance with at least one embodiment described herein. Similarly, an application may load a webkit browser into its own process space to render a web page and attempt to attack the device. If the application attempts to access data in the credential for the browser that the application should not have access to, a user may be alerted to this unauthorized access in accordance with at least one embodiment described herein.

Some of the acts of one or more methods described herein may be provided as software instructions, stored on computer-readable storage media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of one or more methods described herein may be provided as executable software instructions stored in transmission media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The present disclosure makes reference to a number of embodiments. However, other variations and modifications may be made without departing from the scope of the embodiments defined in the claims appended hereto.

The invention claimed is:

1. A method of detecting unauthorized access, the method comprising:
monitoring access to credentials of credential store on a computing device within a time period associated with a first setting, wherein the time period is defined by a time interval or by a duration of an event;
determining that a number of credentials accessed within the time period exceeds a threshold associated with a second setting; and outputting, in a user interface, an indication of potential unauthorized access to the credential store responsive to determining that the number of credentials access within the time period exceeds the threshold, wherein one or more of the credentials are stored in encrypted form.

2. The method of claim 1, wherein each of the credentials accessed within the time period is associated with a different user account.

3. The method of claim 1, further comprising restricting access to one or more credentials of the credential store in response to determining that the number of credentials accessed within the time period.

4. The method of claim 1, wherein at least one of the credentials accessed within the time period comprises a password.

5. The method of claim 1, wherein at least one of the credentials accessed within the time period comprises at least one of: a digital certificate, a cryptographic key, a username, an access code, or a secure data item.

6. The method of claim 1, wherein the credentials comprise at least one of an identifier or an authentication token.

7. The method of claim 1, further comprising decrypting a requested credential when access to the requested credential is provided.

8. The method of claim 1, further comprising receiving a request for at least one credential of the credentials within the time period, and providing access to the at least one credential.

9. The method of claim 8, wherein the request is received by a keyring application, and wherein the request is received from a requesting application that is different from the keyring application.

10. The method of claim 9, wherein the requesting application is a browser application.

11. The method of claim 9, further comprising denying the requesting application access to further credentials in the credential store in response to determining that the number of credentials accessed within the time period exceeds the threshold.

12. The method of claim 1, wherein the first setting is user-configurable.

13. The method of claim 1, wherein the first setting is defined by a security policy governing operation of the computing device.

14. The method of claim 1, wherein the second setting is user-configurable.

15. The method of claim 1, wherein the second setting is defined by a security policy governing operation of the computing device.

16. The method of claim 1, wherein the monitoring comprises recording an identity of each of the credentials accessed within the time period.

17. The method of claim 1, further comprising:

prompting for user input as to whether access to the credential store is unauthorized, in response to determining that the number of credentials accessed within the time period exceeds the threshold;

wherein the indication of potential unauthorized access to the credential store is output in the user interface after user input indicating that the access to the credential store is unauthorized has been received at the computing device.

18. The method of claim 1, wherein the indication of potential unauthorized access to the credential store comprises a description of at least one of the credentials accessed within the time period.

19. The method of claim 18, wherein the at least one credential is identified in a notification displayed on a display.

20. The method of claim 18, wherein the indication of potential unauthorized access to the credential store directs a user of the computing device to take an action to protect the at least one credential.

21. The method of claim 1, wherein at least one credential of the credentials comprises a password, the method further comprising changing the password of each of the at least one credential to a new password.

22. The method of claim 21, further comprising changing at least one additional credential in the credential store to the new password, wherein each of the at least one additional credential comprises a password that corresponds to the password of the at least one credential.

23. A computing device programmed to detect unauthorized access to credentials of a credential store, the computing device comprising a processor configured to:

monitor access to credentials of the credential store within a time period associated with a first setting, wherein the period is defined by a time interval or by a duration of an event;

determine that a number of credentials accessed within the time period exceeds a threshold associated with a second setting; and output, in a user interface, an indication of potential unauthorized access to the credential store responsive to determining that the number of credentials accessed within the time period exceeds the threshold, wherein one or more of the credentials are stored in encrypted form.

24. A non-transitory computer-readable storage medium comprising executable instructions for programming a computing device to detect unauthorized access to credentials of a credential store, the instructions configuring a processor of the computing device to:

monitor access to credentials of the credential store within a time period associated with a first setting, wherein the period is defined by a time interval or by a duration of an event;

determine that a number of credentials accessed within the time period exceeds a threshold associated with a second setting; and output, in a user interface, an indication of potential unauthorized access to the credential store responsive to determining that the number of credentials accessed within the time period exceeds the threshold, wherein one or more of the credentials are stored in encrypted form.

25. The computing device of claim 23, wherein the processor is configured to restrict access to one or more credentials of the credential store in response to determining that the number of credentials accessed within the time period exceeds the threshold.

26. The non-transitory computer-readable storage medium of claim 24, wherein the instructions configure the processor to restrict access to one or more credentials of the credential store in response to determining that the number of credentials accessed within the time period exceeds the threshold.

27. The non-transitory computer-readable storage medium of claim 24, wherein the instructions configure the processor to record an identity of each of the credentials accessed within the time period.

* * * * *